Figures 1, 2:
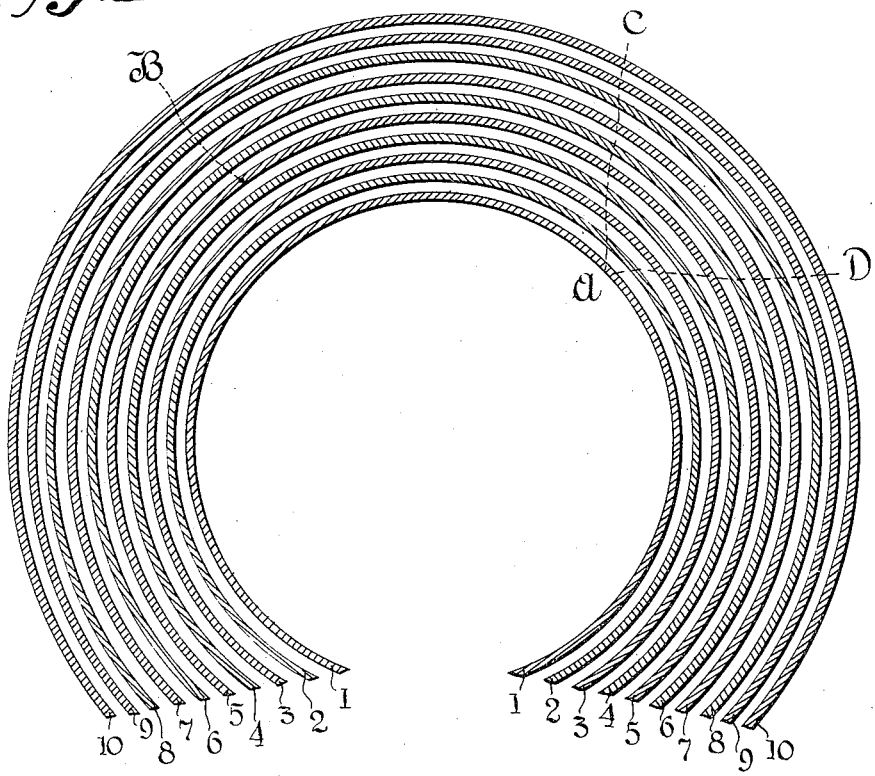

April 23, 1940.                C. W. McKONE                2,198,586
                               PNEUMATIC TIRE
                             Filed Dec. 22, 1936

| Ply Number | Twist | |
|---|---|---|
| 1 and 2 | 17.5 | 7.5 |
| 3 and 4 | 18.0 | 8.0 |
| 5 and 6 | 19.0 | 9.0 |
| 7 and 8 | 20.0 | 10.0 |
| 9 and 10 | 20.5 | 11. |

Inventor:
Charles W. McKone
By Dodge and Sons,
attorneys

UNITED STATES PATENT OFFICE 2,198,586

PNEUMATIC TIRE

Charles W. McKone, Washington, D. C.; Martha W. McKone, administratrix of Charles W. McKone, deceased Application December 22, 1936, Serial No. 117,191

11 Claims. (Cl. 152—356)

This invention relates to pneumatic tires and more particularly to the construction of the cord fabric carcass in a tire.

In its conventional form, a pneumatic vehicle tire is composed of an inner body portion or carcass of laminated cord fabric upon which is superposed in embracing relation an outer tread body of rubber. In this cord fabric carcass, a plurality of plies of the cord fabric are arranged in superposed relation to form a laminated foundation structure of the requisite thickness. These plies, which ordinarily are four or six in number, and may be as many as sixteen, extend transversely of the tire construction from bead to bead thereof, each ply being so disposed that the cords composing the same extend at a bias or angularly across the carcass body. Also in accordance with conventional practice the several fabric plies of the carcass are each impregnated and coated with rubber in such manner and to such degree that each individual cord of each ply is imbedded in rubber to thereby prevent contact between adjoining cords in a given ply or between adjoining cords in the superposed plies.

It is well-known to those familiar with the manufacture of tires that a tire, when subjected to the ordinary stresses and strains while in service, gradually enlarges to a certain maximum point and that after attaining this maximum degree of expansion or enlargement no further expansion takes place. Upon dissecting a tire which has thus been expanded or enlarged to its maximum degree and testing the cords thereof, it will be found that the cords in all of the carcass plies have suffered a considerable loss in elongation, while the tensile strength of the cords is not appreciably altered. If the tire is continued in service over an extended period beyond the time when it has expanded to its maximum degree and to a point where it is approaching the end of its useful life, it will be found upon dissecting the tire and testing the cords thereof that the cords in certain of the carcass plies have suffered a further loss in elongation and that the tensile strength of these cords has also been decreased considerably.

Whereas it has been considered to be desirable, and it has been attempted in the prior art to produce a finished tire in which the elongation of the cords in all plies is uniform, I propose to purposely make the elongation non-uniform, and to graduate it according to the conditions to be met by the cords of individual plies. The main purpose of this invention is then to so treat the cords by twisting or by shrinking or by combined shrinking and twisting that the elongation of the cords of any particular ply is controlled in accordance with the conditions to be met by that particular ply in the finished tire in service.

One of the objects of the invention is to increase the life of pneumatic tires by preliminary treatment of the cords which are to be incorporated in the tire carcass.

Another object is to so treat the cords in the various plies that in the finished tire each set of cords will have the necessary elongation to withstand the stresses to which it is subjected, thus avoiding the presence of particular points of weakness in the tire carcass.

A further object of the invention is to so fashion a cord tire carcass that the elongation of the cords will be graduated so that breakage of the cords must necessarily occur at a neutral point in the carcass, and not in some particular ply as in structures of the prior art.

The objects of this invention may be accomplished either by subjecting the yarn to preliminary shrinking before wet twisting into the desired cord structure or by controlling the degree of twist either with or without shrinking in such a way as to make the twist graduate from one ply to another or from one group of plies to another in the finished tire carcass.

Other objects and improvements according to this invention will be brought out in the following specification when read in connection with the accompanying drawing in which Figure 1 is a diagrammatic view showing in cross-section a cord tire carcass made up of a large number of plies.

Figure 2 is a chart illustrating how the twist imparted to the cords varies from ply to ply in tires made according to the present invention.

After intensive and prolonged study of the causes of failure in cord tires, it has been brought to my attention that failures usually occur in the same portion of tires of one particular design. For example, I have observed that when a blow-out occurs in a tire built entirely of a cord structure made by wet twisting cord with a 19.0-9.0 twist or higher, the immediate point of failure is almost invariably in the innermost ply adjacent to the tube. With low twist cords the failure usually occurs in the outermost ply. In any event the rent produced by the blow-out is of graduated length from the point of fracture inward or outward of the tire. In other words, the failure is usually fan-shaped in cross-section spreading radially inward or outward from the breaking point.

The stresses to which a finished tire are subjected and which result in applying tension to the cords within the tire carcass are well known. Generally speaking, the outstanding stresses result from (1) fatigue of the cords due to continued flexing of the carcass as the tire rolls along; (2) elongation of the cords resulting from the air pressure within the tire; (3) periodic localized elongation caused by blows and shocks received by the tire striking obstacles in its path and, (4) rupture of the cords from an incipient line of separation between the cords and the encasing rubber.

After a tire has been in use for some time, it will be found to show that certain plies of the carcass have changed their elongation more than others with resultant loss in tensile strength of these cords. In practice, it is known that the stresses exerted upon a tire after its manufacture are such as to result in a greater elongation of the cords in certain plies than in others, and that this elongation increases progressively from the outer to the inner plies until it reaches a maximum at the innermost ply.

The condition when fracture occurs in the innermost ply is illustrated diagrammatically in the figure of the drawing, wherein the reference characters 1 to 10 designate the plies of a ten ply tire. The reference character A designates the incipient point of fracture which is characteristic of casing blow-outs in high twist tires of the character referred to above. The dotted lines AC and AD indicate approximately the effect of the initial fracture at point A wherein the failure increases in cross-section from the inside of the tire outwardly.

In accordance with this invention, I propose to so treat the cords making up these plies that in the finished tire the inner plies will be capable of greater elongation than the outer ones. In this way, the ratio of the elongation to the breaking stress will be approximately constant in all plies of the tire. Consequently, the inner plies will possess elongation sufficient to enable them to withstand the excessive stresses to which they are subjected, whereas the outer plies which are not required to have such high elongation will have sufficient elongation to withstand the shocks to which they are subjected. In this way, a tire failure instead of occurring at point A shown in the drawing, will under most conditions occur at some intermediate neutral point such as that indicated at B. The failure will result not from the vulnerability of any particular ply within the tire, but from the particular stresses to which it is subjected in service.

The results contemplated by this invention may be brought about in various ways. The preferred way consists in subjecting the cords to wet treatment and shrinkage in a treating liquid either with or without the addition of a wetting agent before twisting, and then using different degrees of twist for different plies. While the treatment and shrinkage in a treating liquid preferably includes twisting the cords under the liquid, such as water, improved results may be obtained by twisting the cord as it leaves the wetting tank, or by performing the twisting in an atmosphere of high relative humidity. While it has been proposed in the prior art to subject cords to preliminary wetting either with hot or cold water before twisting, it has not, so far as I am aware, been contemplated to add to the treating water or other liquid a wetting agent or to carry out the process for a sufficient length of time and, under proper conditions, to pre-shrink the cotton fabric. The patent to Lister and Warburton, No. 18,461, granted October 20, 1857, describes wet spinning of cotton subjected to preliminary wetting in either hot or cold water but the treatment does not contemplate shrinkage. It is essential in carrying out the treatment according to my invention, that the wetting be carried out long enough and to such a degree that substantially no further shrinkage may occur in the cotton after it is put in a finished tire. By the term "wet twisting" is meant twisting cords, or their constituents, containing a substantial percentage of moisture sufficient to permit ready deformation of the cotton and to reduce its brittleness. In this way, a definite and predetermined elongation may be preserved and the elongation may be so chosen for each ply of the tire that it is greater in those plies subjected to major stresses than it is in those plies which are subjected to minor stresses.

A second method of accomplishing the results according to this invention consists in gradually increasing the twist of the cords from the inner plies outwardly so that the cords in the outer plies are subjected to greater twist than those of the inner plies, but without preliminary shrinkage. The outer plies of the tire are stiffer and are hence less susceptible to expansion than those further in. Hence, the cords of the outer plies should be subjected to higher twist than those near the tube.

Still another method contemplated according to this invention is to pre-shrink the cotton cords by varying degrees and thus to control the elongation in accordance with the position of the ply in the finished tire. In this way, the cords of each particular ply are fashioned and designed to perform the particular function which is later to be required of them. No matter which of the above methods is used the elongation of the cords in the finished tire should always be greater in the inner than in the outer plies.

In making a tire according to any of the above methods, I may use either Egyptian staple cotton or American staple. One particular type of Egyptian staple which I have found to be suitable is a 17—3—3 type 1¹⅜ staple. The nomenclature used herein is the usual terminology of the art e. g. in the symbol 17—3—3, 17 denotes the denier of the yarn, the first 3, the number of yarns in each strand, and the last 3 the number of strands in each cord. While various gradations in the amount of twist imparted may be used successfully, one particular arrangement contemplated by me in the assumed ten ply tire may be as follows:

Plies 1 and 2 _____ 17.5–7.5
Plies 3 and 4 _____ 18 – 8
Plies 5 and 6 _____ 19 – 9
Plies 7 and 8 _____ 20 –10
Plies 9 and 10 _____ 20.5–11

From this example it will be clear that the outermost plies 9 and 10 are subjected to considerably greater twist than the innermost plies 1 and 2. In this way, the elongation of the cords of lower twist will be preserved to a greater extent than in those subjected to higher twist. Hence, the plies subjected to greater flexure and stress will be of an elongation sufficient to withstand those stresses and flexations without rupture. This graduated twist may be carried out either alone or in conjunction with the shrinkage outlined under the methods above described.

In general it may be said that there are two well recognized methods of constructing a tire carcass so that the plies will be balanced in the finished tire. The first method, which is generally used, consists in building up the carcass of groups of plies, each group generally consisting of two plies having the cords of one ply angularly related to the cords of the cooperating ply. Various numbers of such groups may be employed, depending upon the type of tire. The second or other method, consists in building up a tire carcass of groups of plies with the cords of each unit of the group parallel to one another, but angularly related to the cords of plies of the cooperating unit of the group.

In this specification the example given relates to a carcass made by the first method, but it is equally applicable to tires made by the second method. It is also not in any way dependent upon the number of plies used in a group, and should it be found practicable to employ more than two plies in a group, or in a unit, the principles of this invention will find application there. The essential feature is that the cords of each group of plies shall be given the same twist, and made capable of elongating to the same amount to preserve a balanced structure. In other words, each cord is to be made capable of sufficient elongation to permit its withstanding all stresses which it may be called upon to meet, and this function must be maintained compatible with the structural balance of the tire as a whole.

By way of example, the drawing shows a ten ply tire made up according to the first method. Each group of two plies, 1 and 2, 3 and 4, etc., consists of two plies having cords capable of the same elongation, and with the even-numbered ply of any group cooperating with and having its cords angularly related to the cords of the odd-numbered ply of the same group. The application of the invention principle to tires made by the second method is thought to be obvious from the above description, without specific illustrations being given.

Although only a few methods of cord preparation are described herein, it is to be understood that according to the patent statutes, changes may be made in the details, within the scope of the appended claims without departing from the spirit and scope of the invention.

What I claim is:

1. A pneumatic tire having a cord fabric made up of groups of plies in which the cords of different groups have varying twists, the innermost plies having a lower than 19—9 twist, and the outermost plies having a higher than 19—9 twist.

2. A cord tire made up of a plurality of cord plies, the cords being pre-shrunk and wet twisted to varying degrees, the cords of the outer plies being given a higher twist than those of the inner ones.

3. A pneumatic tire of the type having a carcass made up of a plurality of groups of cord plies, the cords of the different groups having varying degrees of twist, the outermost plies having a substantially greater twist than the innermost plies.

4. A pneumatic tire of the type having a carcass made up of a plurality of groups of cord plies, the cords of the different groups being pre-shrunk and wet twisted to varying degrees of twist, the outermost plies having a substantially greater twist than the innermost plies.

5. A pneumatic tire of the type having a carcass made up of a plurality of groups of cord plies, the cords of the different groups being pre-shrunk and wet twisted to varying degrees of twist.

6. A pneumatic tire having a cord fabric carcass made up of groups of plies in which the cords of the various plies are pre-shrunk to produce graduated elongation values of the cords of one group with respect to the cords of another group.

7. A pneumatic tire having a cord fabric carcass in which the cords of the various plies are pre-shrunk to varying degrees, the cords of the inner plies having greater elongation than the cords of the outer plies.

8. A cord tire made up of groups of plies each group consisting of two plies of angularly opposed cords, the cords of each group having a twist different from the cords of other groups and the cords of the outer groups having a higher twist than those of the inner groups.

9. A cord tire made up of groups of plies each group consisting of four plies, each two plies of the group having parallel cords and being angularly opposed to the cords of other two plies, and the cords of each group having a different twist from the cords of other groups and the cords of the outer groups having a higher twist than those of the inner groups.

10. A pneumatic tire of the type having a carcass made up of a plurality of groups of cord plies, the cords of the different groups being pre-shrunk and wet twisted under water.

11. A pneumatic tire of the type having a carcass made up of a plurality of groups of cord plies, the cords of the different groups being pre-shrunk and wet twisted to varying degrees of twist while under water.

CHARLES W. McKONE.